US012803377B2

(12) United States Patent
Shibata et al.

(10) Patent No.: US 12,803,377 B2
(45) Date of Patent: Nov. 17, 2026

(54) ROTOR, ROTARY ELECTRICAL MACHINE, ELECTRIC COMPRESSOR, AND METHOD FOR PRODUCING ROTOR

(71) Applicant: MITSUBISHI HEAVY INDUSTRIES ENGINE & TURBOCHARGER, LTD., Sagamihara (JP)

(72) Inventors: Naomichi Shibata, Kanagawa (JP); Eigo Kato, Tokyo (JP); Wataru Yamada, Tokyo (JP); Hiroaki Yoshizawa, Kanagawa (JP); Makoto Ogawa, Kanagawa (JP); Takaaki Yoshizawa, Kanagawa (JP); Yuki Yakuwa, Kanagawa (JP); Katsuyuki Osako, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 188 days.

(21) Appl. No.: 18/840,430

(22) PCT Filed: Feb. 25, 2022

(86) PCT No.: PCT/JP2022/008009

§ 371 (c)(1),
(2) Date: Aug. 21, 2024

(87) PCT Pub. No.: WO2023/162172

PCT Pub. Date: Aug. 31, 2023

(65) Prior Publication Data

US 2025/0183756 A1 Jun. 5, 2025

(51) Int. Cl.
*H02K 7/08* (2006.01)
*H02K 7/00* (2006.01)
(Continued)

(52) U.S. Cl.
CPC ............. *H02K 7/083* (2013.01); *H02K 7/003* (2013.01); *H02K 15/021* (2025.01); *H02K 15/144* (2025.01)

(58) Field of Classification Search
CPC ...... H02K 7/083; H02K 7/003; H02K 7/1823; H02K 15/021; H02K 15/144
See application file for complete search history.

(56) References Cited

U.S. PATENT DOCUMENTS

| | | | | |
|---|---|---|---|---|
| 5,801,470 | A * | 9/1998 | Johnson | H02K 1/278 310/156.28 |
| 9,709,068 | B2 | 7/2017 | Thompson et al. | |
| 2023/0081243 | A1* | 3/2023 | Li | H02K 1/28 310/156.28 |

FOREIGN PATENT DOCUMENTS

| | | | |
|---|---|---|---|
| CN | 111490626 | A | 8/2020 |
| CN | 211623753 | U * | 10/2020 |

(Continued)

OTHER PUBLICATIONS

CN-211852196-U machine translation Apr. 18, 2026.*
(Continued)

*Primary Examiner* — Leda T Pham
(74) *Attorney, Agent, or Firm* — Birch, Stewart, Kolasch & Birch, LLP

(57) ABSTRACT

In a rotating body and a rotating electric machine, a rotary shaft made of a magnetic body, a rotor fixed to the rotary shaft, and a pair of bearing sleeves for an air bearing that have a cylindrical shape, are mounted on one end portion and the other end portion of the rotor in an axial direction, and have wear-resistant coating layers on outer peripheral surfaces are provided, and the pair of bearing sleeves for an air bearing are provided with the wear-resistant coating layers before assembly to the rotary shaft.

5 Claims, 5 Drawing Sheets

(51) Int. Cl.
*H02K 15/021* (2025.01)
*H02K 15/144* (2025.01)

(56) References Cited

FOREIGN PATENT DOCUMENTS

| | | | | | |
|---|---|---|---|---|---|
| CN | 211852196 | U | * | 11/2020 | ........... F04D 29/057 |
| JP | 09285049 | A | * | 10/1997 | |
| JP | 2002-10543 | A | | 1/2002 | |
| JP | 2002010543 | A | * | 1/2002 | |
| JP | 6845953 | B2 | | 3/2021 | |

OTHER PUBLICATIONS

JP-2002010543-A machine translation Apr. 18, 2026.*
CN-211623753-U machine translation Apr. 18, 2026.*
JP-09285049-A machine translation Apr. 18, 2026.*
International Search Report and Written Opinion of the International Searching Authority for International Application No. PCT/JP2022/008009, dated Apr. 5, 2022, with an English translation.

* cited by examiner

ROTOR, ROTARY ELECTRICAL MACHINE, ELECTRIC COMPRESSOR, AND METHOD FOR PRODUCING ROTOR

TECHNICAL FIELD

The present disclosure relates to a rotating body, a rotating electric machine, an electric compressor, and a method of manufacturing a rotating body.

BACKGROUND ART

For example, since a fuel cell requires air having a high pressure, a two-stage compression type electric compressor is applied. In order to achieve an increase in efficiency of the two-stage compression type electric compressor, an increase in speed is necessary. In a case where the electric compressor is of a centrifugal compression type, it is possible to design high-efficiency vanes, which allows an electric motor to be smaller and lighter. In general, an electric motor (motor) applied to an electric compressor has an air bearing applied to prevent a lubricant from mixing with compressed air, and is operated by supplying the compressed air to the air bearing.

Examples of such an electric compressor include an electric compressor described in PTL 1 below. The electric compressor described in PTL 1 has a magnet disposed in an intermediate portion of a rotary shaft in an axial direction and has a sleeve disposed on an outer side of the magnet. One end portion and the other end portion of the rotary shaft in the axial direction in the sleeve are rotatably supported against a housing by an air bearing.

CITATION LIST

Patent Literature

[PTL 1] Japanese Patent No. 6845953

SUMMARY OF INVENTION

Technical Problem

In the air bearing, an outer peripheral surface of the rotary shaft and an inner peripheral surface of a bearing are in contact with each other in a state where the compressed air is not supplied. When the rotary shaft rotates, the compressed air is supplied to the air bearing, so that the outer peripheral surface of the rotating rotary shaft and the inner peripheral surface of the bearing are separated from each other, and the air bearing rotatably supports the rotary shaft at a predetermined position. That is, at the time of the start of rotation of the rotary shaft, the rotary shaft rotates in a state where the outer peripheral surface of the rotary shaft and the inner peripheral surface of the bearing are in contact with each other, which causes wear. Therefore, a wear-resistant coating is generally applied to the outer peripheral surface of the rotary shaft (sleeve) facing the air bearing. However, in the electric compressor of the related art, in terms of a structure, the sleeve is fixed to the outer peripheral surface of the rotary shaft via shrink fitting after the wear-resistant coating is applied to the outer peripheral surface of the sleeve. In this case, when a heating treatment temperature of the shrink fitting in the sleeve exceeds an application temperature of the wear-resistant coating, there is a concern that the coating layer deteriorates. Therefore, it is difficult to manage the application temperature of the wear-resistant coating or the heating treatment temperature of the shrink fitting.

The present disclosure is devised to solve the above-described problems, and an object of the present disclosure is to provide a rotating body, a rotating electric machine, an electric compressor, and a method of manufacturing a rotating body, which can appropriately ensure a wear-resistant coating for an air bearing.

Solution to Problem

In order to achieve the above object, a rotating body of the present disclosure includes: a rotary shaft made of a magnetic body; a rotor fixed to the rotary shaft; and a pair of bearing sleeves for an air bearing that have a cylindrical shape, are mounted on one end portion and the other end portion of the rotary shaft in an axial direction, and have wear-resistant coating layers on outer peripheral surfaces, in which the pair of bearing sleeves for an air bearing are provided with the wear-resistant coating layers before assembly to the rotary shaft.

In addition, a rotating electric machine of the present disclosure includes: a housing having a hollow shape; a stator that has a cylindrical shape and that is fixed to an inner peripheral surface of the housing; the rotating body that is rotatably supported by the housing such that the rotor faces an inner peripheral surface of the stator with a gap therebetween; and a pair of air bearings provided in the housing such that the pair of air bearings face outer peripheral surfaces of the pair of bearing sleeves for an air bearing with a gap therebetween.

In addition, an electric compressor of the present disclosure includes: the rotating electric machine; a low-pressure wheel that is fixed to one side of the rotary shaft in the axial direction; and a high-pressure wheel that is fixed to the other side of the rotary shaft in the axial direction.

In addition, a method of manufacturing a rotating body of the present disclosure includes: a step of disposing an iron core on an outer peripheral portion of a rotary shaft made of a magnetic body; a step of fixing a holding sleeve to an outer peripheral surface of the iron core via shrink fitting; and a step of mounting a pair of bearing sleeves for an air bearing having wear-resistant coating layers, on one end portion and the other end portion of the rotary shaft in an axial direction.

Advantageous Effects of Invention

According to the rotating body, the rotating electric machine, the electric compressor, and the method of manufacturing a rotating body of the present disclosure, it is possible to appropriately ensure a wear-resistant coating for an air bearing.

DESCRIPTION OF EMBODIMENTS

Hereinafter, a preferred embodiment of the present disclosure will be described in detail with reference to the drawings. The present disclosure is not limited to the embodiment. In addition, in a case where there are a plurality of embodiments, the present disclosure also includes configurations obtained by combining each embodiment. In addition, constituents in the embodiment include constituents that are easily perceivable by those skilled in the art, constituents that are substantially the same, and constituents within a so-called range of equivalents.

In the present embodiment, a rotating body is applied to a rotating electric machine, and the rotating electric machine (motor) is applied to an electric compressor. However, the present embodiment is not limited to this configuration, and the rotating body may be applied to a general electric motor as a rotating electric machine.

<Configuration of Electric Compressor>

Figure 1:
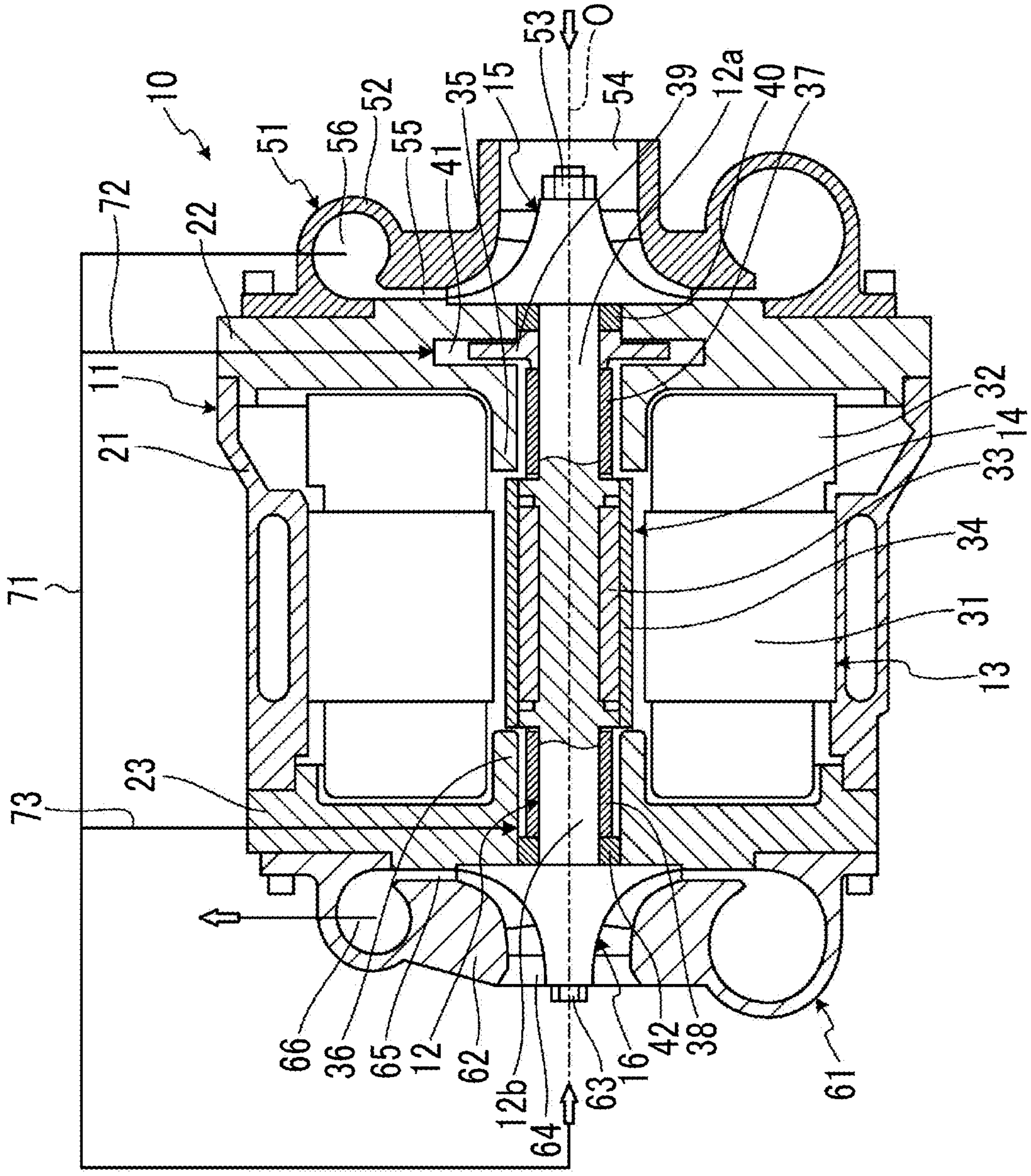
FIG. 1 is a longitudinal sectional view showing an internal configuration of an electric compressor according to the present embodiment.

FIG. 1 is a longitudinal sectional view showing an internal configuration of an electric compressor of a first embodiment.

As shown in FIG. 1, an electric compressor 10 includes a housing 11, a rotary shaft 12, a stator 13, a rotor 14, a low-pressure wheel 15, and a high-pressure wheel 16. The rotating body is constituted by the rotary shaft 12 and the rotor 14. The rotating electric machine is constituted by the housing 11, the rotary shaft 12, the stator 13, and the rotor 14.

The housing 11 has a motor housing 21, a low-pressure side bearing housing 22, and a high-pressure side bearing housing 23. The motor housing 21 has a cylindrical shape, and has an increased diameter at an end portion on one side in an axial direction (right side in FIG. 1). The low-pressure side bearing housing 22 has a disk shape and is disposed on one side in the axial direction in the motor housing 21. The low-pressure side bearing housing 22 is detachably fastened to the end portion of the motor housing 21 on one side in the axial direction by a plurality of bolts. The high-pressure side bearing housing 23 has a disk shape and is disposed on the other side in the axial direction in the motor housing 21. The high-pressure side bearing housing 23 is detachably fastened to an end portion of the motor housing 21 on the other side in the axial direction by a plurality of bolts.

In the motor housing 21 having a cylindrical shape, one opening in the axial direction is closed by the low-pressure side bearing housing 22, and the other opening in the axial direction is closed by the high-pressure side bearing housing 23. Therefore, the housing 11 has a hollow shape by fastening the low-pressure side bearing housing 22 and the high-pressure side bearing housing 23 to the motor housing 21.

The stator 13 is fixed to an inner peripheral portion of the motor housing 21. The stator 13 has a cylindrical shape. The stator 13 has a stator iron core 31 and a stator coil 32. The stator iron core 31 has a cylindrical shape and is fixed such that an outer peripheral surface thereof is in close contact with an inner peripheral surface of the motor housing 21. The stator coil 32 is accommodated inside the stator iron core 31.

The rotary shaft 12 is disposed inside the housing 11. The rotary shaft 12 is disposed along an axial center O concentric with the housing 11, and is rotatably supported by the housing 11 around the axial center O. The rotor 14 is fixed to an outer peripheral portion of the rotary shaft 12 at an intermediate position in the axial direction. The rotor 14 has a rotor iron core (permanent magnet) 33 and a holding sleeve 34. The rotor iron core 33 has a cylindrical shape and is disposed on an outer peripheral surface of the rotary shaft 12. The holding sleeve 34 has a cylindrical shape and is disposed on an outer side of the rotor iron core 33.

In the stator 13 and the rotor 14, an inner peripheral surface and an outer peripheral surface face each other in a radial direction. A gap is provided between the inner peripheral surface and the outer peripheral surface of the stator 13 and the rotor 14. Therefore, when a current flows through the stator coil 32 of the stator 13, the rotor 14 rotates due to attraction and repulsion of magnetic forces generated, and the rotary shaft 12 outputs a rotational force.

The rotary shaft 12 is rotatably supported by a low-pressure side air bearing 35 and a high-pressure side air bearing 36. The rotary shaft 12 is provided with a low-pressure side shaft portion 12*a* on one side in the axial direction with respect to the rotor 14, and is provided with a high-pressure side shaft portion 12*b* on the other side in the axial direction with respect to the rotor 14. In the rotary shaft 12, a low-pressure side bearing sleeve (bearing sleeve for an air bearing) 37 is mounted on the low-pressure side shaft portion 12*a* in an integrally rotatable manner, and a high-pressure side bearing sleeve (bearing sleeve for an air bearing) 38 is mounted on the high-pressure side shaft portion 12*b* in an integrally rotatable manner. The low-pressure side bearing sleeve 37 functions as a low-pressure side shaft portion, and the high-pressure side bearing sleeve 38 functions as a high-pressure side shaft portion.

The low-pressure side air bearing 35 is provided integrally with the low-pressure side bearing housing 22. The low-pressure side air bearing 35 has a cylindrical shape and is formed to extend from an inner surface of the low-pressure side bearing housing 22 to a rotor 14 side. The low-pressure side air bearing 35 is disposed outside the low-pressure side bearing sleeve 37 mounted on the rotary shaft 12. When the rotary shaft 12 rotates, a low-pressure side gap is ensured between an inner peripheral surface of the low-pressure side air bearing 35 and an outer peripheral surface of the low-pressure side bearing sleeve 37.

The high-pressure side air bearing 36 is provided integrally with the high-pressure side bearing housing 23. The high-pressure side air bearing 36 has a cylindrical shape and is formed to extend from an inner surface of the high-pressure side bearing housing 23 to the rotor 14 side. The high-pressure side air bearing 36 is disposed outside the high-pressure side bearing sleeve 38 mounted on the rotary shaft 12. When the rotary shaft 12 rotates, a high-pressure side gap is ensured between an inner peripheral surface of the high-pressure side air bearing 36 and an outer peripheral surface of the high-pressure side bearing sleeve 38.

In the rotary shaft 12, a thrust disk 39 that constitutes a thrust bearing is fixed on one side in the axial direction, and a low-pressure side thrust sleeve 40 is disposed. The thrust disk 39 is fixed between the low-pressure side bearing sleeve 37 and the low-pressure wheel 15 in the rotary shaft 12. The thrust disk 39 rotates integrally with the rotary shaft 12. The low-pressure side bearing housing 22 is provided with a low-pressure side space 41 on an outer circumferential edge of the axial center O. The thrust disk 39 is disposed in the low-pressure side space 41. The low-pressure side space 41 communicates with the low-pressure side gap between the inner peripheral surface of the low-pressure side air bearing 35 and the outer peripheral surface of the low-pressure side bearing sleeve 37. The low-pressure side thrust sleeve 40 is disposed between the low-pressure wheel 15 and the thrust disk 39 in the rotary shaft 12. The low-pressure side thrust sleeve 40 rotates integrally with the rotary shaft 12. A seal member (not shown) is provided on an outer peripheral portion of the low-pressure side thrust sleeve 40. An outer peripheral portion of the seal member comes into contact with an inner peripheral surface of the low-pressure side bearing housing 22. The low-pressure side thrust sleeve 40 is rotatable relative to the low-pressure side bearing housing 22.

In the rotary shaft 12, a high-pressure side thrust sleeve 42 is disposed on the other side in the axial direction. The high-pressure side thrust sleeve 42 is disposed between the high-pressure wheel 16 and the high-pressure side bearing sleeve 38 in the rotary shaft 12. The high-pressure side thrust sleeve 42 rotates integrally with the rotary shaft 12. A seal member (not shown) is provided on an outer peripheral portion of the high-pressure side thrust sleeve 42. An outer peripheral portion of the seal member comes into contact with an inner peripheral surface of the high-pressure side bearing housing 23. The high-pressure side thrust sleeve 42 is rotatable relative to the high-pressure side bearing housing 23.

In the housing 11, a low-pressure compressor 51 is disposed on a low-pressure side bearing housing 22 side, and a high-pressure compressor 61 is disposed on a high-pressure side bearing housing 23 side. The low-pressure compressor 51 has a low-pressure side housing 52 and the low-pressure wheel 15. The high-pressure compressor 61 has a high-pressure side housing 62 and the high-pressure wheel 16.

The low-pressure side housing 52 is fastened to an outer surface of the low-pressure side bearing housing 22 by a plurality of bolts. The low-pressure wheel 15 is disposed inside the low-pressure side housing 52. The low-pressure wheel 15 is fixed to one end portion of the rotary shaft 12 in the axial direction by a nut 53 in an integrally rotatable manner. The low-pressure compressor 51 is provided with an intake port 54, a diffuser 55, a scroll part 56 having a spiral shape, and a discharge port (not shown) by means of the low-pressure side housing 52 and the low-pressure wheel 15.

The high-pressure side housing 62 is fastened to an outer surface of the high-pressure side bearing housing 23 by a plurality of bolts. The high-pressure wheel 16 is disposed inside the high-pressure side housing 62. The high-pressure wheel 16 is fixed to the other end portion of the rotary shaft 12 in the axial direction by a nut 63 in an integrally rotatable manner. The high-pressure compressor 61 is provided with an intake port 64, a diffuser 65, a scroll part 66 having a spiral shape, and a discharge port (not shown) by means of the high-pressure side housing 62 and the high-pressure wheel 16.

In addition, the discharge port (not shown) and the intake port 64 of the low-pressure compressor 51 and of the high-pressure compressor 61 are connected by a connection flow path 71.

In the low-pressure compressor 51, when the low-pressure wheel 15 rotates, external air is taken in through the intake port 54 and is accelerated by a centrifugal force of the low-pressure wheel 15. The accelerated air is decelerated and pressurized by the diffuser 55, then flows through the scroll part 56, and is discharged from the discharge port. The low-pressure air compressed by the low-pressure compressor 51 is fed to the high-pressure compressor 61 by the connection flow path 71. In the high-pressure compressor 61, when the high-pressure wheel 16 rotates, the external air is taken in through the intake port 64 and is accelerated by a centrifugal force of the high-pressure wheel 16. The accelerated air is decelerated and pressurized by the diffuser 65, then flows through the scroll part 66, and is discharged from the discharge port.

In addition, the housing 11 is provided with a low-pressure side air flow path 72 and a high-pressure side air flow path 73. The low-pressure side air flow path 72 supplies the compressed air from the housing 11 to the low-pressure side air bearing 35. The low-pressure side air flow path 72 is provided to branch from the connection flow path 71, and supplies a portion of the compressed air to the low-pressure side space 41. Then, the compressed air in the low-pressure side space 41 is supplied to the low-pressure side gap between the inner peripheral surface of the low-pressure side air bearing 35 and the outer peripheral surface of the low-pressure side bearing sleeve 37 to support the rotary shaft 12 at a predetermined position in the radial direction. Thereafter, the compressed air supplied to the low-pressure side air bearing 35 flows into a gap between the stator 13 and the rotor 14.

The high-pressure side air flow path 73 supplies the compressed air from the housing 11 to the high-pressure side air bearing 36. The high-pressure side air flow path 73 is provided to branch from the connection flow path 71, and supplies a portion of the compressed air to the high-pressure side air bearing 36. The compressed air is supplied to the high-pressure gap between the inner peripheral surface of the high-pressure side air bearing 36 and the outer peripheral surface of the high-pressure side bearing sleeve 38 to support the rotary shaft 12 at a predetermined position in the radial direction. Thereafter, the compressed air supplied to the high-pressure side air bearing 36 flows into the gap between the stator 13 and the rotor 14.

<Rotating Body>

Figure 2:
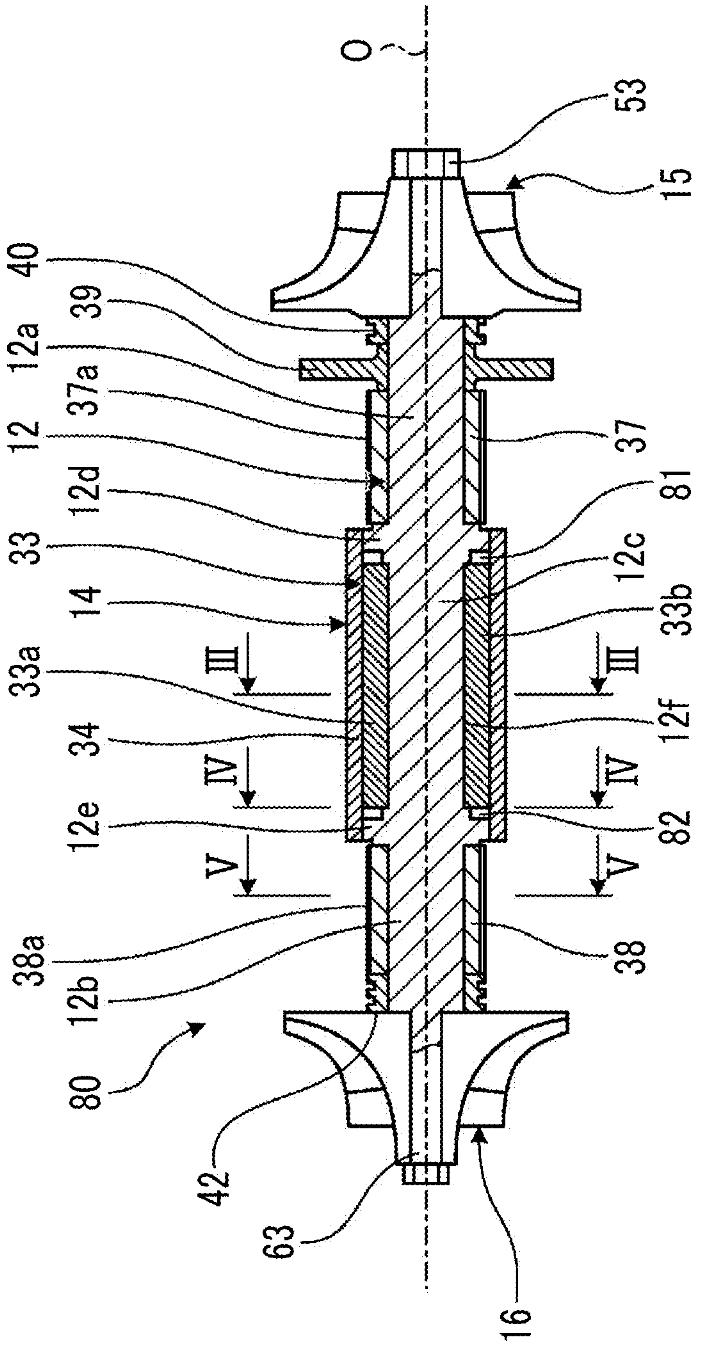
FIG. 2 is a longitudinal sectional view showing a rotating body of the present embodiment.
Figure 3:
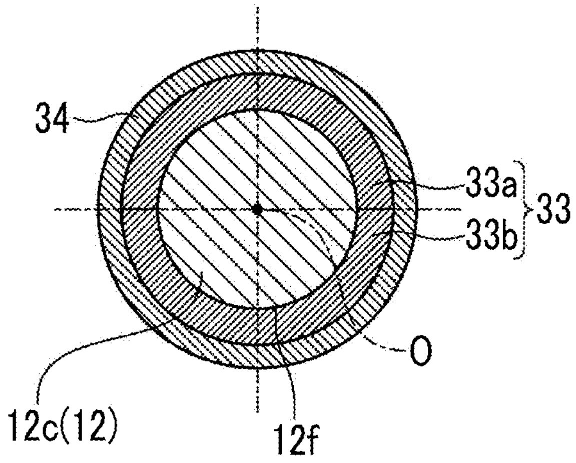
FIG. 3 is a cross-sectional view taken along line III-III of FIG. 2 showing a relationship between a rotary shaft, a rotor iron core, and a holding sleeve.
Figure 4:
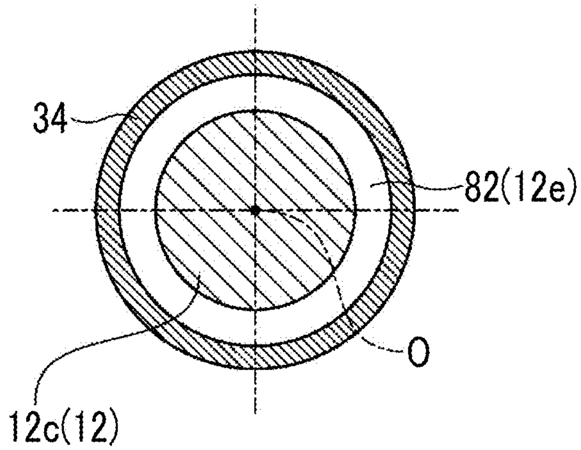
FIG. 4 is a cross-sectional view taken along line IV-IV of FIG. 2 showing a relationship between the rotary shaft and the holding sleeve.
Figure 5:
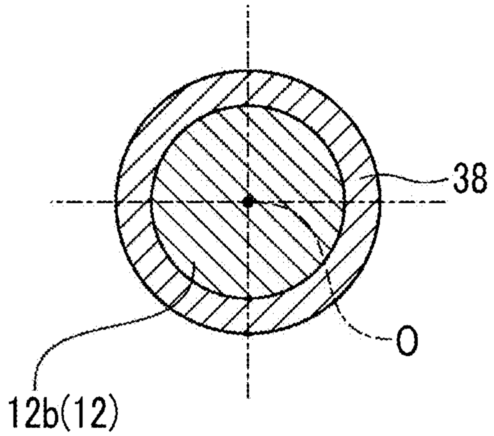
FIG. 5 is a cross-sectional view taken along line V-V of FIG. 2 showing a relationship between the rotary shaft and a bearing sleeve.

FIG. 2 is a longitudinal sectional view showing the rotating body of the present embodiment, FIG. 3 is a cross-sectional view taken along line III-III of FIG. 2 showing a relationship between the rotary shaft, the rotor iron core, and the holding sleeve, FIG. 4 is a cross-sectional view taken along line IV-IV of FIG. 2 showing a relationship between the rotary shaft and the holding sleeve, and FIG. 5 is a cross-sectional view taken along line V-V of FIG. 2 showing a relationship between the rotary shaft and the bearing sleeve.

As shown in FIG. 2, a rotating body 80 has the rotary shaft 12 and the rotor 14. The rotor 14 has the rotor iron core 33 and the holding sleeve 34. The rotor iron core 33 is a permanent magnet having a cylindrical shape, and is disposed on the outer peripheral surface of the rotary shaft 12. The holding sleeve 34 has a cylindrical shape and is disposed on the outer side of the rotor iron core 33.

The rotary shaft 12 is a magnetic body having the axial center O. The rotary shaft 12 has the low-pressure side shaft portion 12*a*, the high-pressure side shaft portion 12*b*, and an intermediate shaft portion 12*c*. The low-pressure side shaft portion 12*a* is located on one side in the axial direction of the rotary shaft 12. The high-pressure side shaft portion 12*b* is located on the other side in the axial direction of the rotary shaft 12. The intermediate shaft portion 12*c* is an intermediate portion in the axial direction of the rotary shaft 12, and is located between the low-pressure side shaft portion 12*a* and the high-pressure side shaft portion 12*b*. In addition, the rotary shaft 12 is provided with a low-pressure side flange portion 12*d* between the low-pressure side shaft portion 12*a* and the intermediate shaft portion 12*c*. The rotary shaft 12 is provided with a high-pressure side flange portion 12*e* between the high-pressure side shaft portion 12*b* and the intermediate shaft portion 12*c*. The low-pressure side flange portion 12*d* and the high-pressure side flange portion 12*e* are provided at an interval in the axial direction of the rotary shaft 12. The low-pressure side flange portion 12*d* and the high-pressure side flange portion 12*e* have the same outer diameter.

In addition, the rotary shaft 12 is provided with an axial recessed portion 12*f* in an outer peripheral portion of the intermediate shaft portion 12*c*. The axial recessed portion 12*f* has a shape recessed between the low-pressure side flange portion 12*d* and the high-pressure side flange portion 12*e* along a circumferential direction toward an axial center O side.

As shown in FIGS. 2 and 3, the rotor iron core 33 is disposed on an outer side of the intermediate shaft portion 12*c* in the rotary shaft 12. The rotor iron core 33 has a plurality of (two in the present embodiment) divided iron cores 33*a* and 33*b* divided in the circumferential direction. The divided iron cores 33*a* and 33*b* may be integrally formed or may be divided into a plurality of pieces in the axial direction. In addition, the divided iron cores 33*a* and 33*b* may be made of a laminated steel plate. The number of divided iron cores 33*a* and 33*b* may be three or more.

The divided iron cores 33*a* and 33*b* are mounted on an outer peripheral surface of the intermediate shaft portion 12*c* in the rotary shaft 12. At this time, the divided iron cores 33*a* and 33*b* are positioned in the axial direction by being fitted to the axial recessed portion 12*f* of which an inner peripheral portion is formed in the intermediate shaft portion 12*c*. At this time, inner peripheral surfaces of the divided iron cores 33*a* and 33*b* are bonded to an outer peripheral surface of the axial recessed portion 12*f*. Therefore, the divided iron cores 33*a* and 33*b* are mounted on the intermediate shaft portion 12*c* between the low-pressure side flange portion 12*d* and the high-pressure side flange portion 12*e*. An outer diameter of the rotor iron core 33 is the same as or slightly smaller than the outer diameters of the low-pressure side flange portion 12*d* and the high-pressure side flange portion 12*e*.

The holding sleeve 34 is disposed on the outer side of the rotor iron core 33. The holding sleeve 34 is located on the outer side of the rotor iron core 33, and has one end portion in the axial direction fixed to an outer peripheral portion of the low-pressure side flange portion 12*d*, and the other end portion fixed to an outer peripheral portion of the high-pressure side flange portion 12*e*. The outer peripheral portions of the low-pressure side flange portion 12*d* and the high-pressure side flange portion 12*e* are inserted into the holding sleeve 34 from one side in the axial direction of the rotary shaft 12. The holding sleeve 34 is fixed to outer peripheral surfaces of the low-pressure side flange portion 12*d*, the rotor iron core 33, and the high-pressure side flange portion 12*e* via shrink fitting. Therefore, an inner peripheral surface of the holding sleeve 34 comes in close contact with the outer peripheral surface of the low-pressure side flange portion 12*d*, the outer peripheral surface of the high-pressure side flange portion 12*e*, and the outer peripheral surface of the rotor iron core 33.

Then, as shown in FIGS. 2 and 4, the rotor iron core 33 is disposed such that end portions thereof are separated from the low-pressure side flange portion 12*d* and the high-pressure side flange portion 12*e* by a predetermined interval set in advance in the axial direction of the rotary shaft 12. Therefore, a low-pressure side space 81 is provided between the rotor iron core 33 and the low-pressure side flange portion 12*d*, and a high-pressure side space 82 is provided between the rotor iron core 33 and the high-pressure side flange portion 12*e*. The low-pressure side space 81 is defined by one end surface of the rotor iron core 33 in the axial direction, an outer surface of the intermediate shaft portion 12*c*, one side surface of the low-pressure side flange portion 12*d*, and an inner surface of the holding sleeve 34. The high-pressure side space 82 is defined by the other end surface of the rotor iron core 33 in the axial direction, the outer surface of the intermediate shaft portion 12*c*, one side surface of the high-pressure side flange portion 12*e*, and the inner surface of the holding sleeve 34.

The low-pressure side space 81 and the high-pressure side space 82 are nonmagnetic bodies. Therefore, the low-pressure side space 81 and the high-pressure side space 82 may be filled with a resin material that is a nonmagnetic body. A strength of the rotor iron core 33 can be increased by filling the low-pressure side space 81 and the high-pressure side space 82 with the resin material.

As shown in FIGS. 1 and 5, the rotary shaft 12 has the low-pressure side bearing sleeve 37 fixed to the low-pressure side shaft portion 12*a*. The low-pressure side bearing sleeve 37 has a cylindrical shape and is lightly press-fitted (fitted with a gap) to the low-pressure side shaft portion 12*a*. The light press fitting is performed by press-fitting the low-pressure side bearing sleeve 37 with a pressure for moving the low-pressure side bearing sleeve 37 in the axial direction with respect to the rotary shaft 12 when a predetermined stress is applied to the low-pressure side bearing sleeve 37 in the axial direction. Therefore, the low-pressure side bearing sleeve 37 is rotatable integrally with the rotary shaft 12.

The rotary shaft 12 has the high-pressure side bearing sleeve 38 fixed to the high-pressure side shaft portion 12*b*. The high-pressure side bearing sleeve 38 has a cylindrical shape and is lightly press-fitted (fitted with a gap) to the high-pressure side shaft portion 12*b*. Therefore, the high-pressure side bearing sleeve 38 is rotatable integrally with the rotary shaft 12.

The low-pressure side bearing sleeve 37 is provided with a wear-resistant coating layer 37*a* by applying a wear-resistant coating on the outer peripheral surface. The high-pressure side bearing sleeve 38 is provided with a wear-resistant coating layer 38*a* by applying a wear-resistant coating on the outer peripheral surface. The wear-resistant coating on the low-pressure side bearing sleeve 37 and the wear-resistant coating on the high-pressure side bearing sleeve 38 are applied before assembly to the rotary shaft 12.

On one side in the axial direction of the rotary shaft 12, the thrust disk 39 is inserted adjacent to the low-pressure side bearing sleeve 37, and the low-pressure side thrust sleeve 40 is inserted. Then, the low-pressure wheel 15 is mounted to one end portion of the rotary shaft 12 in the axial direction, and is fastened by the nut 53 in an integrally rotatable manner. At this time, the low-pressure wheel 15 is pressed toward a stator 13 side by a fastening strength of the nut 53 with respect to the rotary shaft 12. Then, a pressing force of the low-pressure wheel 15 is transmitted to the low-pressure side bearing sleeve 37 via the low-pressure side thrust sleeve 40 and the thrust disk 39, and the low-pressure side bearing sleeve 37 abuts against the low-pressure side flange portion 12*d* to be positioned.

On the other side in the axial direction of the rotary shaft 12, the high-pressure side thrust sleeve 42 is inserted adjacent to the high-pressure side bearing sleeve 38. Then, the high-pressure wheel 16 is mounted to the other end portion of the rotary shaft 12 in the axial direction, and is fastened by the nut 63 in an integrally rotatable manner. At this time, the high-pressure wheel 16 is pressed toward the stator 13 side by a fastening strength of the nut 63 with respect to the rotary shaft 12. Then, a pressing force of the high-pressure wheel 16 is transmitted to the high-pressure side bearing sleeve 38 via the high-pressure side thrust sleeve 42, and the high-pressure side bearing sleeve 38 abuts against the high-pressure side flange portion 12*e* to be positioned.

<Method of Assembling Rotating Body>

Figure 6:
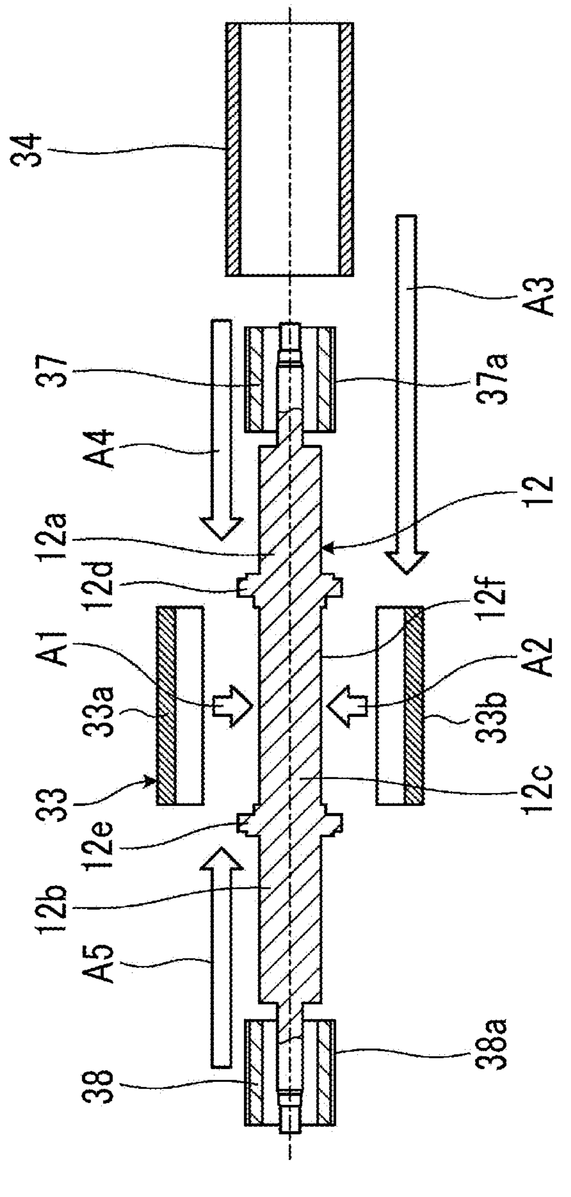
FIG. 6 is an exploded sectional view for describing a method of assembling a rotating body.

FIG. 6 is an exploded sectional view for describing a method of assembling the rotating body.

As shown in FIG. 6, the rotary shaft 12 has the low-pressure side flange portion 12*d* and the high-pressure side flange portion 12*e*. The rotor iron core 33 is constituted by the two divided iron cores 33*a* and 33*b*. First, the divided iron cores 33*a* and 33*b* are located outside the intermediate shaft portion 12*c* of the rotary shaft 12 in the radial direction, and the divided iron cores 33*a* and 33*b* are moved in arrow A1 and A2 directions, which are directed inward in the radial direction of the rotary shaft 12, to be brought into close contact with the intermediate shaft portion 12*c*.

At this time, inner peripheral portions of the divided iron cores 33*a* and 33*b* are positioned in the axial recessed portion 12*f* of the intermediate shaft portion 12*c*, and inner peripheral surfaces thereof are bonded to the axial recessed portion 12*f*. Therefore, the rotor iron core 33 is disposed such that one end portion in the axial direction is separated from the low-pressure side flange portion 12*d* by a predetermined interval, and the other end portion in the axial direction is separated from the high-pressure side flange portion 12*e* by a predetermined interval.

Next, the holding sleeve 34 is located on one side in the axial direction with respect to the rotary shaft 12, and the holding sleeve 34 is moved in an arrow A3 direction, which is the other side in the axial direction of the rotary shaft 12, to be disposed outside the low-pressure side flange portion 12*d*, the rotor iron core 33, and the high-pressure side flange portion 12*e* in the radial direction. At this time, the holding sleeve 34 is fixed to the low-pressure side flange portion 12*d*, the rotor iron core 33, and the high-pressure side flange portion 12*e* via shrink fitting. That is, the holding sleeve 34 is expanded and widened in inner diameter by being heated, and in this state, the holding sleeve 34 is located outside the low-pressure side flange portion 12*d*, the rotor iron core 33, and the high-pressure side flange portion 12*e*. Thereafter, the holding sleeve 34 is cooled to shrink and reduce in inner diameter, and the inner peripheral surface of the holding sleeve 34 presses the outer peripheral surfaces of the low-pressure side flange portion 12*d*, the rotor iron core 33, and the high-pressure side flange portion 12*e*.

Therefore, the holding sleeve 34 is in a fixed state of being firmly joined to the low-pressure side flange portion 12*d*, the rotor iron core 33, and the high-pressure side flange portion 12*e*. That is, the rotary shaft 12, the rotor iron core 33, and the holding sleeve 34 are integrally joined. At this time, the low-pressure side space 81 is formed between the rotor iron core 33 and the low-pressure side flange portion 12*d*, and the high-pressure side space 82 is formed between the rotor iron core 33 and the high-pressure side flange portion 12*e*.

Subsequently, the low-pressure side bearing sleeve 37 is located on one side in the axial direction with respect to the rotary shaft 12, and the low-pressure side bearing sleeve 37 is moved in an arrow A4 direction, which is the other side in the axial direction of the rotary shaft 12, to be lightly press-fitted to the low-pressure side shaft portion 12*a*. In addition, the high-pressure side bearing sleeve 38 is located on the other side in the axial direction with respect to the rotary shaft 12, and the high-pressure side bearing sleeve 38 is moved in an arrow A5 direction, which is one side in the axial direction of the rotary shaft 12, to be lightly press-fitted to the high-pressure side shaft portion 12*b*. In this case, since the wear-resistant coating is applied to each of the outer peripheral surfaces of the low-pressure side bearing sleeve 37 and the high-pressure side bearing sleeve 38 before assembly, the low-pressure side bearing sleeve 37 and the high-pressure side bearing sleeve 38 are respectively provided with the wear-resistant coating layers 37*a* and 38*a*.

Then, as shown in FIG. 2, after the thrust disk 39 and the low-pressure side thrust sleeve 40 are inserted into one end portion of the rotary shaft 12, the low-pressure wheel 15 is mounted and fastened by the nut 53. In addition, after the high-pressure side thrust sleeve 42 is inserted into the other end portion of the rotary shaft 12, the high-pressure wheel 16 is mounted and fastened by the nut 63.

<Operation of Electric Compressor>

In the electric compressor 10, when a current (AC voltage) flows through the stator coil 32 included in the stator 13, a magnetic field is generated around the stator 13, a rotating magnetic field (magnetic force) is generated, and an N pole and an S pole are generated around the stator 13. The rotor iron core 33 (rotor 14) is rotated by being attracted by the rotating magnetic field of the stator 13. At this time, the rotor iron core 33 is a magnetic body, and a magnetic flux along the circumferential direction is generated. Then, the low-pressure side space 81 is formed on one side in the axial direction in the rotor iron core 33, and the high-pressure side space 82 is formed on the other side. Since the low-pressure side space 81 and the high-pressure side space 82 are nonmagnetic bodies, leakage of the magnetic flux in the axial direction in the rotor iron core 33 is prevented. In a case where the low-pressure side space 81 and the high-pressure side space 82 are filled with the resin material, the strength of the rotor iron core 33 is increased.

The low-pressure side flange portion 12*d* and the high-pressure side flange portion 12*e* of the rotary shaft 12 have higher rigidity than the rotor iron core 33. Therefore, when the holding sleeve 34 fixes the rotor iron core 33 to the rotary shaft 12 via shrink fitting, an intermediate portion of the holding sleeve 34 in the axial direction deforms toward the axial center O side and presses the rotor iron core 33, so that a contact area between the rotary shaft 12 and the rotor iron core 33 and the holding sleeve 34 is increased, which increases the strength against the centrifugal force.

In addition, the rotary shaft 12 is a magnetic body, and the magnetic flux of the rotor iron core 33 flows through the rotary shaft 12. Then, a rotational force of the rotor iron core 33 is transmitted to the holding sleeve 34 via a surface contact portion of an outer peripheral portion of the rotor iron core 33, and is further transmitted to the rotary shaft 12 via a surface contact between the holding sleeve 34 and the low-pressure side flange portion 12*d* and the high-pressure side flange portion 12*e*. When the rotary shaft 12 rotates, the low-pressure wheel 15 and the high-pressure wheel 16 connected to the respective end portions rotate to compress the air.

Effect of Action of Present Embodiment

The rotating body according to a first aspect includes: the rotary shaft 12 made of a magnetic body; the rotor 14 fixed to the rotary shaft 12; and the pair of bearing sleeves (bearing sleeves for an air bearing) 37 and 38 that have a cylindrical shape, are mounted on one end portion and the other end portion of the rotor 14 in the axial direction, and have the wear-resistant coating layers 37*a* and 38*a* on the outer peripheral surfaces, in which the pair of bearing sleeves 37 and 38 are provided with the wear-resistant coating layers 37*a* and 37*b* before assembly to the rotary shaft 12.

According to the rotating body according to the first aspect, the bearing sleeves 37 and 38 supported by the air bearings 35 and 36 are manufactured separately from the rotary shaft 12, and after the wear-resistant coating layers 37*a* and 38*a* are applied, the bearing sleeves 37 and 38 are assembled to the rotary shaft 12. Therefore, the deterioration of the wear-resistant coating layers 37*a* and 38*a* can be suppressed, and the wear-resistant coating layers 37*a* and 38*a* can be appropriately ensured.

In the rotating body according to a second aspect, the rotor 14 has the rotor iron core 33 made of a magnet that has a cylindrical shape, that is divided into a plurality of pieces in the circumferential direction, and that is disposed on the outer side of the rotary shaft 12 in the radial direction. Accordingly, the divided iron cores 33*a* and 33*b* can be mounted to the rotary shaft 12 by being moved in the radial direction from the outer side, thereby improving the ease of assembly of the rotor iron core 33.

In the rotating body according to a third aspect, the rotary shaft 12 has the pair of flange portions 12*d* and 12*e* provided at an interval in the axial direction, and the rotor iron core 33 is disposed between the pair of flange portions 12*d* and 12*e* and is integrally fixed to the rotary shaft 12 by fixing one end portion and the other end portion of the holding sleeve 34 having a cylindrical shape in the axial direction to the outer peripheral portions of the pair of flange portions 12*d* and 12*e*. Accordingly, since the pair of flange portions 12*d* and 12*e* are provided in the rotary shaft 12, the rotating body 80 can be easily assembled by disposing the holding sleeve 34 on the outer side of the rotor iron core 33 and fixing the holding sleeve 34 to the pair of flange portions 12*d* and 12*e* after the rotor iron core 33 is assembled to the rotary shaft 12. That is, the work of fixing a pair of end plates (the pair of flange portions 12*d* and 12*e*) for fixing the holding sleeve 34 to the rotary shaft 12 is not required. As a result, the number of parts can be reduced, and the assembly work can be simplified.

In the rotating body according to a fourth aspect, the holding sleeve 34 is fixed to the outer peripheral surfaces of the pair of flange portions 12*d* and 12*e* and to the outer peripheral surface of the rotor iron core 33 via shrink fitting. Accordingly, the rotary shaft 12, the rotor iron core 33, and the holding sleeve 34 can be integrally joined, and the assembly work can be simplified. In addition, a compressive load is applied to the rotor iron core 33 by the holding sleeve 34, which suppresses damage due to a centrifugal force acting on the rotor iron core 33 during rotation. Furthermore, the wear-resistant coating layers 37*a* and 38*a* can prevent deterioration due to a heat treatment for shrink fitting.

In the rotating body according to a fifth aspect, the rotor iron core 33 has a cylindrical shape and is disposed on the outer peripheral portion of the rotary shaft 12, and the holding sleeve 34 is fixed to the outer peripheral surface of the rotor iron core 33 via shrink fitting. That is, in the above-described embodiment, the pair of flange portions 12*d* and 12*e* are provided in the rotary shaft 12, and the divided iron cores 33*a* and 33*b* are disposed between the pair of flange portions 12*d* and 12*e* to form the rotor iron core 33. However, the present disclosure is not limited to this configuration. The rotor iron core 33 may be integrally formed in a cylindrical shape, the rotor iron core 33 may be inserted into the rotary shaft 12 from one side in the axial direction of the rotary shaft 12, and the holding sleeve 34 may be fixed to the outer peripheral surface of the rotor iron core 33 via shrink fitting. Accordingly, a structure of the rotary shaft 12 can be simplified. Alternatively, the rotor iron core 33 may be fixed to the rotary shaft 12 by an adhesive agent, or the pair of end plates (the pair of flange portions 12*d* and 12*e*) may be fixed to the rotary shaft 12 by welding or the like.

In the rotating body according to a sixth aspect, the bearing sleeves 37 and 38 are lightly press-fitted to one end portion and the other end portion of the rotary shaft 12 in the axial direction, respectively. Accordingly, the bearing sleeves 37 and 38 can be temporarily positioned at predetermined positions with respect to the rotary shaft 12, and the ease of assembly of the bearing sleeves 37 and 38 can be improved.

The rotating electric machine according to a seventh aspect includes: the housing 11 having a hollow shape; the stator 13 that has a cylindrical shape and that is fixed to the inner peripheral surface of the housing 11; the rotating body 80 that is rotatably supported by the housing 11 such that the rotor 14 faces the inner peripheral surface of the stator 13 with a gap therebetween; and the pair of air bearings 35 and 36 provided in the housing 11 such that the pair of air bearings 35 and 36 face the outer peripheral surfaces of the pair of bearing sleeves 37 and 38 with a gap therebetween. Accordingly, the wear-resistant coating layers 37*a* and 38*a* can be appropriately ensured.

The electric compressor according to an eighth aspect includes: the rotating electric machine; the low-pressure wheel 15 that is fixed to one side of the rotary shaft 12 in the axial direction; and the high-pressure wheel 16 that is fixed to the other side of the rotary shaft 12 in the axial direction. Accordingly, the wear-resistant coating layers 37*a* and 38*a* can be appropriately ensured.

A method of manufacturing a rotating body according to a ninth aspect includes: a step of disposing the rotor iron core 33 on the outer peripheral portion of the rotary shaft 12 made of a magnetic body; a step of fixing the holding sleeve 34 to the outer peripheral surface of the rotor iron core 33 via shrink fitting; and a step of mounting the pair of bearing sleeves 37 and 38 having the wear-resistant coating layers 37*a* and 38*a*, on one end portion and the other end portion of the rotary shaft 12 in the axial direction. Accordingly, the deterioration of the wear-resistant coating layers 37*a* and 38*a* can be suppressed, and the wear-resistant coating layers 37*a* and 38*a* can be appropriately ensured.

REFERENCE SIGNS LIST

10: Electric compressor
11: Housing
12: Rotary shaft
12*a*: Low-pressure side shaft portion
12*b*: High-pressure side shaft portion
12*c*: Intermediate shaft portion
12*d*: Low-pressure side flange portion
12*e*: High-pressure side flange portion
12*f*: Axial recessed portion
13: Stator
14: Rotor
15: Low-pressure wheel
16: High-pressure wheel
21: Motor housing
22: Low-pressure side bearing housing
23: High-pressure side bearing housing

31: Stator iron core
32: Stator coil
33: Rotor iron core
33*a*, 33*b*: Divided iron core
34: Holding sleeve
35: Low-pressure side air bearing
36: High-pressure side air bearing
37: Low-pressure side bearing sleeve (bearing sleeve for an air bearing)
37*a*: Wear-resistant coating layer
38: High-pressure side bearing sleeve (bearing sleeve for an air bearing)
38*a*: Wear-resistant coating layer
39: Thrust disk
40: Low-pressure side thrust sleeve
41: Low-pressure side space
42: High-pressure side thrust sleeve
51: Low-pressure compressor
52: Low-pressure side housing
53, 63: Nut
54, 64: Intake port
55, 65: Diffuser
56, 66: Scroll part
61: High-pressure compressor
62: High-pressure side housing
71: Connection flow path
72: Low-pressure side air flow path
73: High-pressure side air flow path
80 Rotating body
81: Low-pressure side space
82: High-pressure side space

The invention claimed is:

1. A rotating body comprising:

a rotary shaft made of a magnetic body;

a rotor fixed to the rotary shaft; and a pair of bearing sleeves for an air bearing that have a cylindrical shape, are mounted on one end portion and the other end portion of the rotary shaft in an axial direction, and have wear-resistant coating layers on outer peripheral surfaces, wherein the pair of bearing sleeves for an air bearing are provided with the wear-resistant coating layers before assembly to the rotary shaft, the rotor has an iron core made of a magnet that has a cylindrical shape, that is divided into a plurality of pieces in a circumferential direction, and that is disposed on an outer side of the rotary shaft in a radial direction, the rotary shaft has a pair of flange portions provided at an interval in the axial direction, and the iron core is disposed between the pair of flange portions and is integrally fixed to the rotary shaft by fixing one end portion and the other end portion of a holding sleeve having a cylindrical shape in the axial direction to outer peripheral portions of the pair of flange portions, and the holding sleeve is fixed to outer peripheral surfaces of the pair of flange portions and to an outer peripheral surface of the iron core via shrink fitting and its inner peripheral surface is in close contact with the outer peripheral surfaces of the pair of flanges and the outer peripheral surface of the iron core.

2. The rotating body according to claim 1, wherein the pair of bearing sleeves for an air bearing are lightly press-fitted to one end portion and the other end portion of the rotary shaft in the axial direction, respectively.

3. A rotating electric machine comprising:

a housing having a hollow shape;

a stator that has a cylindrical shape and that is fixed to an inner peripheral surface of the housing;

the rotating body according to claim 1 that is rotatably supported by the housing such that the rotor faces an inner peripheral surface of the stator with a gap therebetween; and a pair of air bearings provided in the housing such that the pair of air bearings face outer peripheral surfaces of the pair of bearing sleeves for an air bearing with a gap therebetween.

4. An electric compressor comprising:

the rotating electric machine according to claim 3;

a low-pressure wheel that is fixed to one side of the rotary shaft in the axial direction; and a high-pressure wheel that is fixed to the other side of the rotary shaft in the axial direction.

5. A method of manufacturing a rotating body, the method comprising:

a step of disposing an iron core on an outer peripheral portion of a rotary shaft and between the pair of flange portions provided at an interval in the axial direction, made of a magnetic body, wherein the iron core made of a magnet that has a cylindrical shape, that is divided into a plurality of pieces in a circumferential direction, and that is disposed on an outer side of the rotary shaft in a radial direction;

a step of fixing a holding sleeve that has a cylindrical shape, to outer peripheral surfaces of the pair of flange portions and an outer peripheral surface of the iron core via shrink fitting and the holding sleeve inner peripheral surface is in close contact with the outer peripheral surfaces of the pair of flanges and the outer peripheral surface of the iron core; and a step of mounting a pair of bearing sleeves for an air bearing having wear-resistant coating layers, on one end portion and the other end portion of the rotary shaft in an axial direction.

* * * * *